A. J. WIGHT & W. L. MEEKER.

Improvement in Railroad Turn-Tables.

No. 4,410. Reissued May 30, 1871.

Witnesses:
C. Wahlers.
E. Bilhuber.

Inventors.
A. J. Wight
Wm L. Meeker
by
Van Santvoord & Hauff
Attys

AM. PHOTO-LITHOGRAPHIC CO. N.Y. (OSBORNE'S PROCESS)

UNITED STATES PATENT OFFICE.

ANDREW JACKSON WIGHT AND WILLIAM LEWIS MEEKER, OF NEWARK, NEW JERSEY.

IMPROVEMENT IN RAILROAD TURN-TABLES.

Specification forming part of Letters Patent No. 104,388, dated June 14, 1870; reissue No. 4,410, dated May 30, 1871.

*To all whom it may concern:*

Be it known that we, ANDREW JACKSON WIGHT and WILLIAM LEWIS MEEKER, both of Newark, in the county of Essex and State of New Jersey, have invented a new and useful Improvement in Turn-Tables; and we do hereby declare the following to be a full, clear, and exact description thereof, which will enable those skilled in the art to make and use the same, reference being had to the accompanying drawing forming part of this specification, in which drawing—

Figure 1:
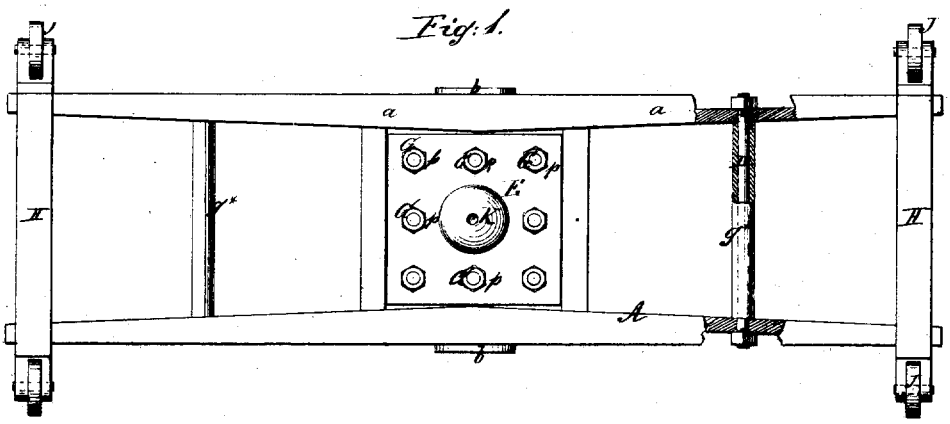
Figure 2:
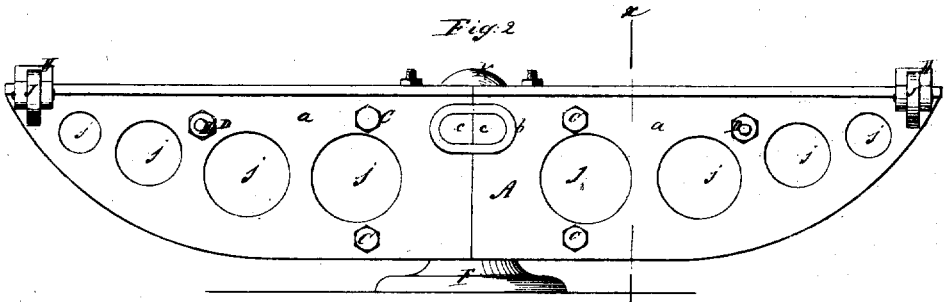
Figure 3:
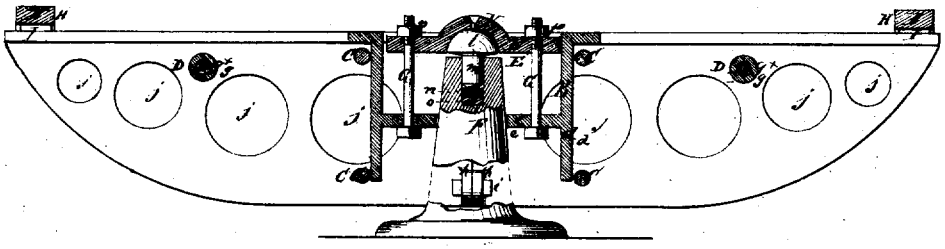
Figure 4:
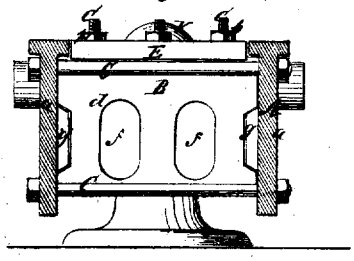

Figure 1 is a plan or top view of this invention. Fig. 2 is a side view of the same. Fig. 3 is a longitudinal vertical section of the same taken through the center. Fig. 4 is a transverse vertical section of the same taken in the line *x x*, Fig. 2.

Similar letters indicate corresponding parts.

This invention relates to a new and improved turn-table for railroads and drawbridges. It consists in a peculiarity of construction, as hereinafter fully shown and described, whereby several advantages are obtained, to wit, economy of construction and fitting up for use, strength and durability, and facility of adjustment in case of getting out of a proper horizontal position.

To enable those skilled in the art to fully understand and construct our invention, we will proceed to describe it.

The main portion or body A of our turn-table is composed of four castings, *a a a a*, each side having two equal parts, *a a*, the inner ends of which abut against each other, and are secured in contact by wrought-iron straps *b*, which are of oval form, (see Fig. 2,) and fitted over lugs *c*, the latter being cast with and projecting from the outer surfaces of the parts *a* of the sides of the body A. Each part *a* has one-half of an oval lug cast with it at its inner end near its upper edge, so that the lugs of the two parts *a a*, at each side of the body A, when in contact, form a laterally-projecting oval to receive the strap *b*, the latter being fitted on the former while hot, so that the straps will shrink in cooling, fit snugly, and make a secure connection. The upper surfaces or edges of the two parts *a a* of the side pieces are, when thus secured in contact, in the same plane, and the lower edges are curved and form a segment of an ellipse or circle, as shown in Figs. 2 and 3, the widest or deepest portions of said segments being at the inner or abutting ends of the castings. B designates a central casting, composed of two vertical plates, *d d*, and a horizontal connecting-plate, *e*, said parts being all cast in one piece, the vertical side plates being cast with openings *f f*, (see Fig. 4,) to obtain lightness, while their edges are provided with recesses to receive projections *g*, extending from the inner surfaces of the parts *a*, as shown in Fig. 4. The two sides of the body A are secured to two opposite sides of the central casting B by transverse bolts C, and through said sides extend bolts D, which pass through tubular shafts $g^{\times}$ placed between the two sides. (See Fig. 1.) By these means the parallelism of the two sides of the turn-table is preserved. From the inner surface of the two parts *a a* of the sides of the turn-table lugs *h* project, through which keys *l* pass, to retain said parts in line or in the same plane with each other. (See Fig. 3.) The projections *g* at the inner surfaces of the part *a*, in consequence of filling in the recesses in the plates *d d* of the casting B, prevent any vertical movement of the parts *a*, and the latter are cast with openings *j*, in order to obtain lightness. E designates a plate of cast-iron, which is fitted in the space formed by the sides of the turn-table and the vertical plates *d d* of the central casting B. In the center of the under surface of this plate there is a concave, *k*, the inner surface of which is lined with an anti-friction metal in order to resist wear, and this concave rests upon a hardened steel hemisphere, *l*, formed on the upper end of a stem, *m*, which is fitted in a socket in the upper part of the cast-iron support F, the latter being firmly secured at the center of a bed of masonry, over which the turn-table is fitted and works. The lower end of the stem *m* is convex, and it rests upon a steel plate, *n*, placed in the socket of the support, and this plate rests upon a composition plate, *o*. (See Fig. 3.)

The under surface of the hemisphere *l* does not come in contact with the upper end of the support F. By this arrangement friction and wear and tear are avoided.

The object in placing the composition plate *o* beneath the steel pate *n* is to prevent the latter from turning to any considerable extent within the socket of the support F.

If the end of the hardened stem *m* should bear against the cast-iron of the support F the latter would soon become so worn as to permit the shoulder of the part *l* to bear upon the end of the pedestal, and consequently impede the rotation of the turn-table.

If the steel disk *n* is placed beneath the end of the stem, it in a measure overcomes this difficulty, but, owing to its form and the shape of the socket, it is liable to turn in the latter and produce an undue amount of friction, detrimental to the socket.

Inasmuch as the convex end of the stem is comparatively small, the friction due to its contact with the steel plate is materially reduced beyond that produced by turning the plate and stem together; or, in other words, by turning the plate in the socket. To prevent this latter difficulty the composition plate *o* is introduced between the steel plate and cast-metal socket, and the increased friction due to the contact of the soft with the harder metal prevents the steel plate from turning with the stem.

The plate E is connected by bolts G to the horizontal plate *e* of the central casting B, and by turning the nuts *p* of said bolts the turn-table may be raised or lowered bodily, or adjusted as required to keep it in a proper horizontal position; and while raised or lowered the sides *a a* are held securely in position by the projections *g g* catching in recesses in the vertical side plates *d d* of the central casting. This is a great advantage, as it obviates the necessity of jacking up the turn-table in order to accomplish such results, which is attended with considerable delay and trouble. In this operation the lugs or projections *g* on the inner surfaces of the side pieces *a a* are of great importance, since by means of these projections the connection between the body A and the central casting B is rendered firm, and in turning the nuts *p* the body A is compelled to follow the motion of the central casting.

The parts in contact, which form the pivot on which the turn-table is revolved, are kept properly lubricated by having a hole made centrally in plate E to admit of oil passing down between the concave *k* and hemisphere *l*, as shown in Fig. 3, and a requisite quantity of oil may be put into the recess which receives the stem *m* of the hemisphere.

In order to prevent the outer ends of the parts *a* of the sides of the turn-table from breaking under the concussions and jars occasioned by a locomotive or trains of cars passing over them, we support the rails by transverse bars or sleepers H, placed on the side pieces, and resting on elastic cushions I, fitted in recesses in the upper surfaces of the parts *a*, (see Fig. 3;) or, if the bars H form the bearings for the wheels J working on the circular track of the turn-table, we place the track-supporting sleepers alongside of said bars, so that the rails do not rest on the latter; and in this case the bars H may be made to straddle the ends of the side pieces *a a*, and the India-rubber cushions may be placed beneath the side pieces instead of above, as shown in the drawing.

The weight of a locomotive is very great—from twenty to thirty tons—and in some instances even greater. This immense weight would, unless some provisions were made to obviate jars and concussions, fracture the castings *a* near their outer ends were they of comparatively little depth.

The turn-table may be operated or turned with the greatest facility, there being but little friction to contend with, and in order to keep the table at the proper level all that is required is simply to adjust the nuts *p* of the bolts G. It will be seen, therefore, that but little care and attention are required to keep the table in proper working order.

We do not claim, broadly, an iron turn-table, nor constructing an iron turn-table of several parts secured together by fastenings, irrespective of the particular fastenings and the mode of construction herein shown and described.

What we claim as new, and desire to secure by Letters Patent, is—

1. Connecting the parts *a a a a*, composing the sides of the turn-table, by means of the oval straps or bands *b* of wrought-iron fitted over lugs or projections *c* cast on the outer surfaces of the parts *a*, in combination with the central casting B, constructed, as shown, with the two vertical plates *d d* and the horizontal plate *e*, all cast in one piece, together with the bolts C D for securing the castings *a* to the center-piece B, and securing the former at the proper distance apart, substantially as shown and described.

2. The keys *i*, passing through lug *h* at the inner side of the parts *a*, in combination with the projections *g*; also, at the inner sides of parts *a*, and fitting in recesses in the vertical plates *d d* of the central casting B, for the purpose of retaining said parts *a* in proper position, as set forth.

3. The side pieces *a a a a* of a turn-table, constructed as described, and provided with projections *g* fitting in recesses in the vertical plates *d d* of the central casting B, in combination with the adjusting-screws G G, said projections retaining the side pieces in the proper position while the same are being adjusted up or down, substantially as described.

4. The elastic cushions *i*, in combination with the cross-bars H and side pieces *a a a a* of a turn-table, substantially as set forth.

5. The combination of the disks *n o* with the stem *m* of the hemisphere *l*, which supports the bearing-plate E of the turn-table, substantially as described.

This speeification signed by us this 3d day of May, 1871.

ANDREW J. WIGHT.
WILLIAM LEWIS MEEKER.

Witnesses:
W. HAUFF,
E. F. KASTENHUBER.